United States Patent Office 3,101,326
Patented Aug. 20, 1963

3,101,326
POLYSULFIDE POLYMER CONTAINING STYRENE OXIDE AS AN ODOR MASKER, AND MIXTURE THEREOF WITH AN EPOXY RESIN
Lewis Montesano, Upper Montclair, N.J., assignor to Bell Telephone Laboratories, Incorporated, New York, N.Y., a corporation of New York
No Drawing. Filed Aug. 15, 1961, Ser. No. 131,497
5 Claims. (Cl. 260—43)

This invention relates to novel compositions of matter comprising a polysulfide with styrene oxide in which the offensive odor of the polysulfide is effectively masked.

As described in United States Patent 2,402,977, the organic polysulfide compounds are formed by reaction of an inorganic alkaline polysulfide (monomer) and alkaline hydrosulfide mixture with organic compounds having two or more carbon-attached negative radical substituents, commonly chlorine atoms, capable of removal by reaction with the inorganic reagent. Suitable inorganic alkaline polysulfide monomers are, for example, the alkaline disulfides, trisulfides, tetrasulfides, pentasulfides, and hexasulfides of cations such as sodium, potassium, or ammonium. Suitable inorganic hydrosulfides are those of sodium, potassium cesium, lithium and ammonium. Suitable multifunctional organic compounds for reaction therewith are, for example, $$CHCl_3$$
$$Cl_2CHCH_2Cl$$
$$ClCH_2CHClCH_2Cl$$
$$ClCH_2CHClCH_2CH_2Cl$$

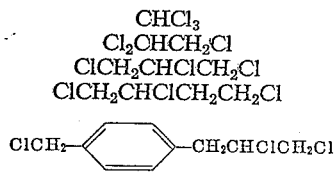

The carbon chains of the multifunctional compounds may also contain linking oxygen atoms. Examples of such materials are

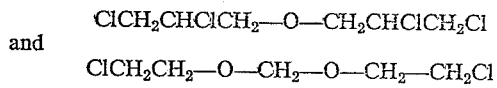

and
$$ClCH_2CH_2—O—CH_2—O—CH_2—CH_2Cl$$

Though chloride has been shown as the radical capable of splitting off in the presence of the alkaline polysulfide-hydrosulfide mixture, other halogens and other negative radicals, such as nitrate, sulfate, acid sulfate, carbonate, acetate, propionate and similar acting groups, can also be used, as taught in the aforementioned patent.

When compounds such as those above, or mixtures of two or more of such compounds, are treated with an alkaline hydrosulfide-polysulfide mixture, the polysulfide acts to promote chain growth, either linear or crosslinked, or both, by a splitting off of the negatively-substituted groups in the organic materials. The hydrosulfide tends to introduce —SH groups into the organic materials by replacement of the negative radicals, and in a competing reaction functions also to cleave chains formed by the alkaline polysulfide. Complicated structures result from these reactions, particularly where the organic compounds originally used have reactive functional groups in addition to those in a terminal position.

Depending on the ratio of alkaline polysulfide to alkaline hydrosulfide in the reaction mixture, the viscosity of the resulting product is variable. A high polysulfide to hydrosulfide ratio will result in a viscous product because of the predominance of the chain-forming inorganic alkaline polysulfide. When the chain splitting inorganic alkaline hydrosulfide is present in a greater proportion, a less viscous material containing smaller polymer species will be the product. In molar proportions, the alkaline polysulfide and alkaline hydrosulfide as described in the aforementioned patent may vary between a 9 to 1 predominance of polysulfide to hydrosulfide, or a 9 to 1 ratio of alkaline hydrosulfide to alkaline polysulfide. For purposes of cable plugging, but not necessarily for other uses, an organic polysulfide resin with a viscosity at 25° C. not greater than 2.5 poises and preferably of the order of 8 to 14 poises is usually used.

The polysulfides discussed above are suitable for use in forming gels and more particularly, for use in cable-plugging mixtures. Still a further use of the organic polysulfides is found as a substitute for natural rubber in the manufacture of oil base lines, engine gaskets and other products to be used in contact with oil, such use taking advantage of the unusual resistance of the polysulfides to the solvent and dispersing action of the gasoline and lubricating oils.

Unfortunately, the polysulfides evidence the characteristic offensive odor of the mercaptan or thiol group, so limiting the practical application thereof due to inherent difficulties in human handling.

In accordance with this invention novel compositions comprising an organic polysulfide and styrene oxide are described wherein the offensive odor of the polysulfide is effectively masked. There may also be included in the novel compositions a polyepoxide compound formed by the reaction of a dihydric phenol with a 1,2-epoxy compound, such compositions being of particular interest for use as a cable sealant.

The polysulfides employed in the present inventive technique may be any of those described above. A number of these polysulfides are marketed commercially under various trade names, one such group being marketed by the Thiokol Corporation and including "Thiokol LP-3," "Thiokol LP-8" and "Thiokol LP-33." These commercial resins may be represented by the general formula $$HS(CH_2)_2[(OCH_2)_2CH_2S_2—(CH_2)_2]_x(OCH_2)_2CH_2SH$$

where $x$ is an integer such that the total molecular weight is approximately 1000. They differ primarily in molecular weight, crosslinking and viscosity as evidenced by the following data:

| Resin | Molecular weight | Percent crosslinking | Viscosity in centipoises at 27° C. |
|---|---|---|---|
| Thiokol LP-3 | 1,000 | 2 | 700–1,200 |
| Thiokol LP-8 | 500–700 | 2 | 250– 350 |
| Thiokol LP-33 | 1,000 | 0.5 | 1,300–1,500 |

An organic polysulfide suitable for use in forming gels, and, more particularly for use in cable-plugging mixtures may be prepared according to the technique of United States Patent 2,402,977 as follows. A 2 molar solution of sodium disulfide and a 2 molar solution of sodium hydrosulfide are mixed, 2,000 cubic centimeters of the hydrosulfide, with 50 cubic centimeters of water containing 25 grams of crystallized magnesium chloride. The mixture is heated with agitation to a temperature of 160° F., when 4 moles of dichlorodiethyl formal are added dropwise over the space of an hour. The temperature of the mixture during this dropwise addition should be kept below 180° F. After all the organic material has been added, external heat should be applied to maintain the temperature at 180° F. for about one additional hour. Agitation is then stopped and the resultant dispersion allowed to settle. The supernatant liquid is drawn off, and the residue washed several times by agitation with water, settling, and withdrawal of the wash fluid. The settled dispersion is acidified to a pH of about 6, then washed repeatedly with water as before. Acid treatment causes coagulation, so producing a thick syrupy material. The structure of the product may be approximated by the formula

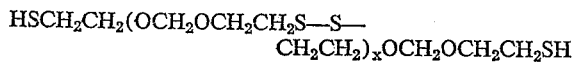

where $x$ is an integer such that the total molecular weight is approximately 1000.

A material even more suitable for the production of cable plugs is obtained by the inclusion of up to about 2 mole percent of trichloropropane with the dichlorodiethyl formal used in making the polymer. Crosslinked structures and structures capable of crosslinking are thereby obtained. These structures are too complex to permit a single representation by formulae but are characterized by additional SH groups in other than terminal positions.

In order to effectively mask the odor of the polysulfides styrene oxide is employed in an amount within the range of 5–30 parts by weight per 100 parts by weight of polysulfide. Although a value of 5 parts by weight is indicated as a lower limit, it will be appreciated by those skilled in the art that values less than 5 may be employed depending upon the particular polysulfide employed. The use of greater than 30 parts by weight per 100 parts by weight of polysulfide may be tolerated, however, such quantities fail to produce any further perceptible effect in masking the offensive odor.

The polyepoxy compounds useful for forming gels are well known in the art and their nature is described for example in United States Patent 2,506,486, issued May 2, 1950, to H. L. Bender, A. G. Farnham and J. W. Guyer. They are preferably either monomeric or partially polymerized forms of a diglycidyl ether of a diphenol, commonly prepared by reacting 2 or more molar proportions of epichlorhydrin with one molar proportion of a diphenol. The materials may be represented by the formula

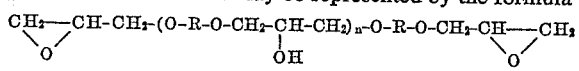

where R is an aromatic-bearing radical which may vary considerably in nature and $n$ is an integer generally within the range of 5–9. Diphenols suitable for reacting with epichlorhydrin are, as described in the aforementioned patent, No. 2,506,486 of the general formula

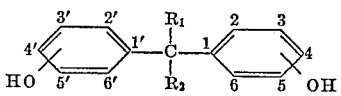

in which the phenolic hydroxy groups may be in the 2,2′; 2,3′; 2,4′, 3,3′, 3,4′ positions on the aromatic rings. The equivalence of positions 2 and 6, 2′ and 6′, or 3 and 5 and 3′ and 5′ is to be noted. $R_1$ and $R_2$ may be hydrogen, methyl, ethyl, propyl, isopropyl, butyl, isobutyl, pentyl, isopentyl, hexyl, isohexyl, a cyclohexyl including the methyl, ethyl, propyl butyl, pentyl, and hexyl substituted cyclohexyl or a phenyl including the methyl, ethyl, propyl, butyl, pentyl and hexyl substituted phenyls.

Diphenols of the types discussed when reacted with epichlorhydrin will produce diglycidyl ethers of the general formula

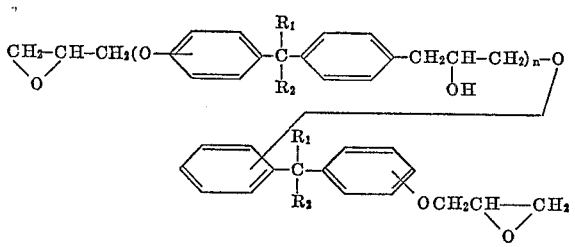

where $R_1$ and $R_2$ have the same designation as above, and epoxy propoxy groups are positioned as are the phenolic hydroxy groups in the parent diphenol. The value of $n$ in such compositions is such as to give a fluid material and is preferably below 5. Preparation of such diglycidyl ethers from epichlorhydrin and the diphenols proceeds in the presence of a basic or alkali-oxide, such as sodium hydroxide as is known in the art and described in United States Patent 2,506,486 noted above. Mixtures of the above-described components, that is of the polyepoxide and polysulfide compounds, will react slowly in the absence of a catalyst, giving a soft gel within a period of several weeks. Inclusion of a catalyst, such as an alkaline substance will accelerate the reaction so that gelation time is considerably reduced. Suitable catalysts for such purposes are the polyamines or polyamides.

In order to effectively mask the offensive odor of the polysulfides contained in the polyepoxide compositions the proportions of styrene oxide as set forth above are employed. However, variations beyond the indicated limits may be tolerated without any deleterious effects.

The following examples are given by way of illustration and are not to be construed as limiting the invention, many variations of which are possible within the spirit and scope thereof.

Example 1

This example illustrates the masking of the odor of a liquid organic polysulfide polymer prepared as follows and available commercially from the Thiokol Corporation as "Thiokol LP–3."

2.5 moles of sodium hydrosulfide, as a 2 molar aqueous sodium hydrosulfide solution, and 2.5 moles of 2 molar sodium disulfide, as a 2 molar aqueous solution are thoroughly mixed. Twenty-five grams of crystallized magnesium chloride dissolved in 50 cc. of water are added to the mixture. The mixture is heated with agitation to a temperature of 160° F. and 4 moles of dichlorodiethyl formal containing 2 percent by weight of 1,2,3-trichloropropane are added dropwise over a period of one hour. The temperature of the mixture is not allowed to exceed 180° F. After all the organic material has been added, the mixture is kept for an additional hour at 180° F. The resulting dispersion is allowed to settle, the supernatant liquid is decanted, and the remaining dispersion washed repeatedly with $H_2O$. The residuum is then acidified to a pH of about 6 to coagulate the material, and then is washed repeatedly with $H_2O$. 100 parts by weight of the resulting polymer and 5 parts by weight of styrene oxide were thoroughly stirred to blend the ingredients. The product was examined and the offensive polysulfide odor was not noticeable.

Example 2

The procedure of Example 1 was repeated with the use of 10 parts by weight rather than 5 parts by weight of styrene oxide. The product evidenced an odor similar to that of the product of Example 1.

Example 3

This example illustrates the masking of the offensive odor of the polysulfide of Example 1 where used in preparing an epoxy resin composition wherein the resin is a polyglycidyl ether of a phenolformaldehyde condensation having a viscosity within the range of 6000—16,000 centistokes and containing approximately 1 gram mole of epoxy group per 178 grams.

(a) A mixture of 100 parts of the polyglycidyl ether, 25 parts of polysulfide, 10 parts of triethylene tetramine (TETA) curing agent and 10 parts of styrene oxide was prepared. The mixture was thoroughly stirred to blend the ingredients and maintained at room temperature. The product was examined and the offensive polysulfide odor was not noticeable.

(b) The above procedure was repeated in the absence of styrene oxide. Examination of the composition clearly indicated the offensive odor of the polysulfide.

Example 4

The procedure of Example 2 was repeated with the addition of 50, 75, and 100 parts of polysulfide rather than 25 parts. In each case the resultant mixture did not evidence the offensive polysulfide odor.

Although the invention has been described in terms of the polysulfides, it will be appreciated by those skilled in the art that styrene oxide may be utilized as an effective masking agent for any compound containing the offensive mercaptan or thiol radical, the proportions required being dependent on the specific compound.

Many commercially available epoxy resins may be treated with polysulfides in combination with styrene oxide in accordance with the present invention. Among these are "Bakelite ERL-3794," "Bakelite ERL-2774," "Epi-Rez 504," "Epi-Rez 510," "Epon 820," etc. The physical properties of these epoxy resins, such as viscosity, melting point, etc. are described in the literature, for example, in "Epoxy Resins" by H. Lee and K. Neville, McGraw-Hill Book Company, Incorporated, New York, New York, 1957. The type and properties of the resins discussed above are as follows:

| Commercial name | Type | Average molecular weight | Epoxide equivalent weight | Viscosity in centipoises at 25° C. |
|---|---|---|---|---|
| Bakelite ERL-3794 | Glycidyl ether of bisphenol F (nondilute) | 350-400 | 138-150 | 7,000-19,000 |
| Bakelite ERL-2774 | Diglycidyl ether of bisphenol A (nondilute) | 350-400 | 185-200 | 11,000-14,000 |
| Epi-Rez 504 | Diglycidyl ether of bisphenol A (contains 11-12% of butyl glycidyl ether) | 350-400 | 170-180 | 150-200 |
| Epi-Rez 510 | Diglycidyl ether of bisphenol A (nondilute) | 350-400 | 180-195 | 10,000-16,000 |
| Epon 820 | Diglycidyl ether of bisphenol A (contains 2-3% of phenyl glycidyl ether) | 350-400 | 180-195 | 4,000-10,000 |

What is claimed is:

1. A composition of matter comprising a liquid organic polysulfide polymer formed by reaction of an inorganic alkaline polysulfide and an alkaline hydrosulfide mixture with at least one organic compound having at least two carbon-attached negative radical substituents capable of removal by reaction with the inorganic reagent, and styrene oxide in an amount within the range of 5-30 parts by weight per 100 parts by weight of liquid polysulfide polymer.

2. A composition of matter in accordance with claim 1 wherein said polysulfide polymer is formed by the polymerization of dichlorodiethylformal and trichloropropane in the presence of inorganic alkaline polysulfides and hydrosulfides.

3. A composition of matter in accordance with claim 1 wherein said styrene oxide is present in an amount of approximately 10 parts by weight per 100 parts by weight of polysulfide.

4. A composition of matter in accordance with claim 1 wherein there is present a polyepoxide formed by the reaction between a diphenol and epichlorohydrin.

5. A composition of matter in accordance with claim 4 wherein said polyepoxide is a polyglycidyl ether of a phenolformaldehyde condensation product and contains approximately 1 gram mole of epoxy group per 178 grams.

References Cited in the file of this patent
UNITED STATES PATENTS
2,871,217    Howard _____ Jan. 27, 1959